(12) United States Patent
Okada et al.

(10) Patent No.: US 8,382,078 B2
(45) Date of Patent: Feb. 26, 2013

(54) BUMP STOPPER

(75) Inventors: Naoto Okada, Kitaibaraki (JP); Takuya Kishida, Kitaibaraki (JP)

(73) Assignee: NOK Corporation (JP)

( * ) Notice: Subject to any disclaimer, the term of this patent is extended or adjusted under 35 U.S.C. 154(b) by 365 days.

(21) Appl. No.: 12/594,556

(22) PCT Filed: Jun. 14, 2007

(86) PCT No.: PCT/JP2007/061967
§ 371 (c)(1),
(2), (4) Date: Oct. 2, 2009

(87) PCT Pub. No.: WO2008/129685
PCT Pub. Date: Oct. 30, 2008

(65) Prior Publication Data
US 2010/0117276 A1 May 13, 2010

(30) Foreign Application Priority Data
Apr. 6, 2007 (JP) .................................. 2007-100624

(51) Int. Cl.
*F16M 1/00* (2006.01)
*B60G 13/00* (2006.01)

(52) U.S. Cl. ........................................ 267/140; 267/220
(58) Field of Classification Search ................... 267/139, 267/140, 219, 220, 196, 201
See application file for complete search history.

(56) References Cited

U.S. PATENT DOCUMENTS

| 5,678,808 A | * | 10/1997 | Claude et al. ............... 267/64.15 |
| 2003/0047897 A1 | * | 3/2003 | Hurrlein et al. ........ 280/124.147 |

FOREIGN PATENT DOCUMENTS

| JP | 4-194428 A | | 7/1992 |
| JP | 08285002 | * | 11/1996 |
| JP | 09-052505 A | | 2/1997 |
| JP | 09-79305 | * | 3/1997 |
| JP | 09-079305 A | | 3/1997 |
| JP | 10217730 A | * | 8/1998 |
| JP | 2000-301923 A | | 10/2000 |
| JP | 200301923 | * | 10/2000 |
| JP | 2006-069463 A | | 3/2006 |
| JP | 2008-302709 | * | 12/2008 |

* cited by examiner

*Primary Examiner* — Bradley King
*Assistant Examiner* — Vishal Sahni
(74) *Attorney, Agent, or Firm* — Harness, Dickey & Pierce, P.L.C.

(57) ABSTRACT

To provide a bump stopper (1) having constricted parts (2A, 2B) in the circumferential surface and exhibiting buffering action by deforming resiliently when an annular distal end portion (3) collides against a partner member (61) in a state that a bump stopper central axis (0) is inclined to a collision surface (62), without sliding on the collision surface (62), thereby generation of noise being suppressed, the distal end portion (3) has a outside diameter and an inside diameter which expand toward the end, a diameter $d_1$ at a collision start point (4) at the most distal end of the inner diameter surface is set substantially equal to or larger than the outside diameter $d_2$ of the constricted part (2A) located just above it, and the distal end portion (3) deforms to tilt further to the outer diameter side through action of moment at the time of collision.

3 Claims, 4 Drawing Sheets

$(d_1 \geq d_2)$

BUMP STOPPER

CROSS-REFERENCE TO RELATED APPLICATIONS

This is a national phase of the International Application No. PCT/JP2007/061967 filed on Jun. 14, 2007 and published in Japanese language.

BACKGROUND OF THE INVENTION

1. Field of the Invention

The present invention relates to a bump stopper used in a vehicular suspension, a shock absorber or the like.

2. Description of the Conventional Art

In a vehicular suspension apparatus supporting a knuckle rotatably supporting a wheel to a vehicle body via a suspension arm so as to be movable up and down, a bump stopper is used in a vehicle body side. In other words, the bump stopper is installed to the vehicle body side, and opposes to a collision surface provided in an upper surface of the suspension arm in a contactable manner. When the vehicle body bumps largely while compressing a suspension spring, that is, when the vehicle body moves down in a direction of coming close to a road surface, the bump stopper comes into contact with the collision surface of the arm, thereby regulating a maximum bump amount of the vehicle body.

A bump stopper 51 having the function mentioned above is formed in a cylindrical shape by a rubber-like elastic body as shown in FIG. 5A, is provided with a constricted part 52 in a circumferential surface so as to be formed as a bellows shape, and is elastically deformed at a time of coming into collision with a collision surface 62 of an arm 61 by an annular distal end portion 53 in an axial direction so as to achieve a buffering action. The bump stopper distal end portion 53 has an outside diameter becoming smaller toward a distal side and is formed in a thin shape for buffering a primary shock.

Further, there are the bump stoppers for a front side and a rear side. Among them, since the front bump stopper is supported by a rod of an absorber, it comes into collision in such a state that a central axis of the bump stopper is orthogonal to the collision surface. However, since the rear bump stopper 51 is not supported by another part, it comes into collision in such a state that a bump stopper central axis O is inclined with respect to the collision surface 62 of the arm 61 as illustrated.

Accordingly, in the latter rear bump stopper, since a collision start point 54 of the bump stopper distal end portion 53 is positioned at the inclined side with respect to a bump stopper thickness, the bump stopper distal end portion 53 starts slipping on the collision surface 62 of the arm 61 from the collision time as shown in FIG. 5B (an arrow A), the slip is promoted together with the compression of the bump stopper 51, and there is a disadvantage that a noise (an abnormal noise) is generated at this time.

Reference is made to Japanese Unexamined Patent Publication No. 2006-69463, Japanese Unexamined Patent Publication No. 9-79305, and Japanese Unexamined Patent Publication No. 9-52505.

SUMMARY OF THE INVENTION

Problem to be Solved by the Invention

The present invention is made by taking the point mentioned above into consideration, and an object of the present invention is to provide a bump stopper in which a slip on a collision surface can be suppressed at a time when a bump stopper distal end portion comes into collision with a partner member such as a suspension arm or the like, thereby inhibiting a noise from being generated.

Means for Solving the Problem

In order to achieve the object mentioned above, in accordance with a first aspect of the present invention, there is provided a bump stopper for a rear suspension having a constricted part in a circumferential surface and elastically deforming at a time of coming into collision with a partner member by an annular distal end portion in an axial direction so as to achieve a buffering action, in which the bump stopper distal end portion comes into collision with the partner member in a state that a bump stopper central axis is inclined with respect to a collision surface of the partner member, wherein the bump stopper distal end portion has such a shape that an outside diameter is made larger toward the distal side and an inner diameter enlarges, and a diameter at a collision start point positioned at the most distal end of an inner diameter surface is set to be equal to or larger than an outside diameter of the constricted part positioned just above the same.

Further, in accordance with a second aspect of the present invention, there is provided a bump stopper as recited in the above first aspect, wherein the bump stopper distal end portion has an outside diameter surface, an inner diameter surface and a distal end surface intersecting them, the outside diameter surface and the inner diameter surface are formed in taper shapes enlarging diameters toward their distal ends respectively, the distal end surface is formed in a taper shape reducing diameter toward its distal end, and a diameter at a collision start point set at an intersecting point of the inner diameter surface and the distal end surface is set to be equal to or larger than an outside diameter of the constricted part positioned just above the same.

Further, in accordance with a third aspect of the present invention, there is provided a bump stopper as recited in the first aspect or the second aspect, wherein a diameter of the constricted part close to the bump stopper distal end portion is set to a shape which is larger than the diameter of the constricted part above the same.

Effect of the Invention

In the bump stopper in accordance with the present invention provided with the structures mentioned above, since the outside diameter of the bump stopper distal end portion is made larger toward the distal side and the inner diameter is formed in the diameter enlarging shape, the bump stopper distal end portion is set in such a trumpet shape that the distal end expands as a whole, and the diameter at the collision start point positioned at the most distal end of the inner diameter surface is set to be equal to or larger than the outside diameter of the constricted part positioned just above the same. Accordingly, when the bump stopper comes into contact with the partner member at the collision start point in the state that the bump stopper distal end portion is inclined, a load moment caused by collision reaction force acts on the bump stopper distal end portion, and the trumpet-shaped bump stopper distal end portion is deformed in such a manner as to collapse further to the outside diameter side on the basis of the moment. Accordingly, since the collapsing direction is the opposite direction to the slipping direction in the description of the conventional art mentioned above, it is possible to substantially inhibit occurrence of the slip. If the diameter of the constricted part close to the bump stopper distal end portion is set to the shape which is larger than the diameter of the constricted part above the same, the trumpet-shaped bump stopper distal end portion tends to further collapse to the outside diameter side.

Therefore, in accordance with the present invention, it is possible to inhibit the bump stopper distal end portion from slipping on the collision surface at a time when it comes into collision with the partner member, whereby it is possible to inhibit the noise from being generated by the slip.

In addition, as described in the second aspect, since the bump stopper distal end portion having the trumpet-shaped expanded shape generally has three surfaces of the outside diameter surface, the inner diameter surface and the distal end surface intersecting them, the outside diameter surface and the inner diameter surface are formed in the taper shapes enlarging diameters toward their distal ends respectively, the distal end surface is formed in the taper shape reducing diameter toward its distal end, and the diameter at the collision start point set at the intersecting point of the inner diameter surface and the distal end surface is set to be equal to or larger than the outside diameter of the constricted part positioned just above the same.

DETAILED DESCRIPTION OF PREFERRED EMBODIMENT

The present invention includes the following modes.

(1) A shape of a bump stopper distal end is formed in such a shape that an outside diameter is made larger toward the end and an inner diameter enlarges.

(2) A diameter at a collision start point of a distal end is set to be equal to or larger than an outside diameter of a constricted part just above the same.

(3) Since the diameter at the collision start point of the distal end is set to be equal to or larger than the outside diameter of the constricted part just above the same, a moment is applied to the collision start point in the distal end by using a thickness inside the constricted part, as a fulcrum and a slip of the bump stopper distal end at a time of coming into collision with a swing arm surface is thereby prevented.

Embodiment

Next, a description will be given of an embodiment in accordance with the present invention with reference to the accompanying drawings.

Figure 1:
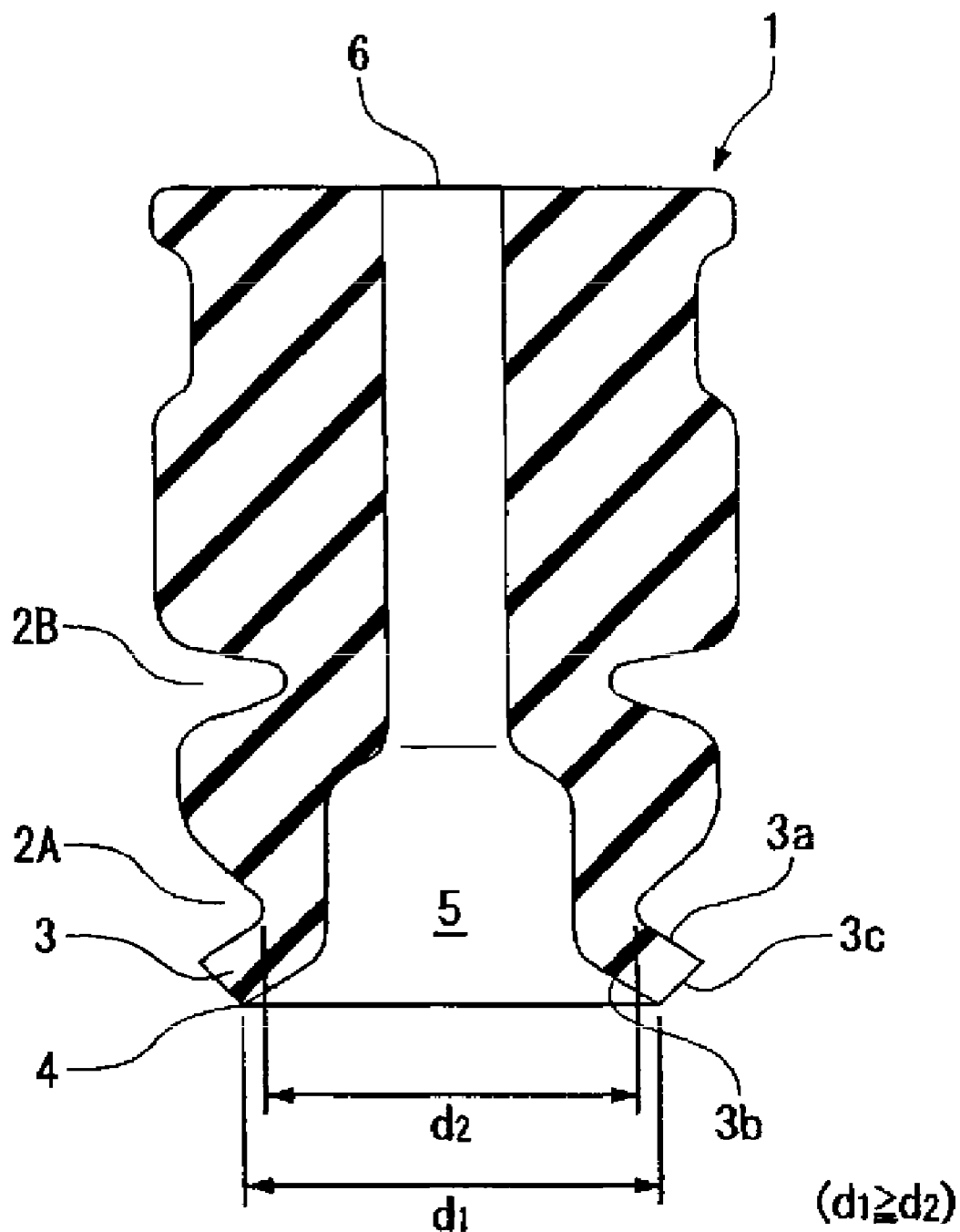
FIG. 1 is a sectional view of a bump stopper in accordance with an embodiment of the present invention.

FIG. 1 shows a vertical section of a bump stopper 1 in accordance with an embodiment of the present invention, and FIG. 2 shows a vertical section of a substantial part in an operating state of the bump stopper 1.

As shown in FIG. 1, the bump stopper 1 in accordance with the embodiment is formed in a cylindrical shape by a rubber-like elastic body such as a rubber, a foam rubber, a foam urethane elastomer or the like, is provided with a desired number of (two in the figure) annular constricted parts 2A and 2B in a circumferential surface (an outside diameter surface) thereof so as to have a bellows portion, and is structured such as to achieve a buffering action by elastically deforming at a time of coming into collision with a partner member 61 (refer to FIG. 2) by an annular distal end portion 3 in an axial direction.

Further, the bump stopper 1 in accordance with the embodiment is used in a vehicular rear suspension, and the bump stopper distal end portion 3 is structured, as shown in FIG. 2, such as to come into collision with the partner member 61 in a state that a bump stopper central axis O is inclined with respect to a collision surface 62 of the partner member (a suspension arm) 61.

The bump stopper distal end portion 3 is formed in such a trumpet shape having an expanding distal end as a whole that an outside diameter thereof is made larger toward the distal side and an inner diameter enlarges, and a diameter $d_1$ at a collision start point 4 positioned at one position on a circumference of an inner diameter surface most distal end is set to a dimension equal to or larger than an outside diameter $d_2$ of a constricted part 2A positioned just above the same ($d_1 \geq d_2$).

Further, the bump stopper distal end portion 3 has an outside diameter surface 3a, an inner diameter surface 3b and a distal end surface 3c intersecting them. Among them, the outside diameter surface 3a and the inner diameter 3b are formed in taper shapes enlarging diameter toward their distal ends respectively, and the distal end surface 3c is formed in a taper shape reducing diameter toward its distal end. The diameter $d_1$ at the collision start point 4 set at an intersecting point of the inner diameter surface 3b and the distal end surface 3c is set to a dimension equal to or larger than the outside diameter $d_2$ of the constricted part 2A positioned just above the same ($d_1 \geq d_2$).

Figure 2A:
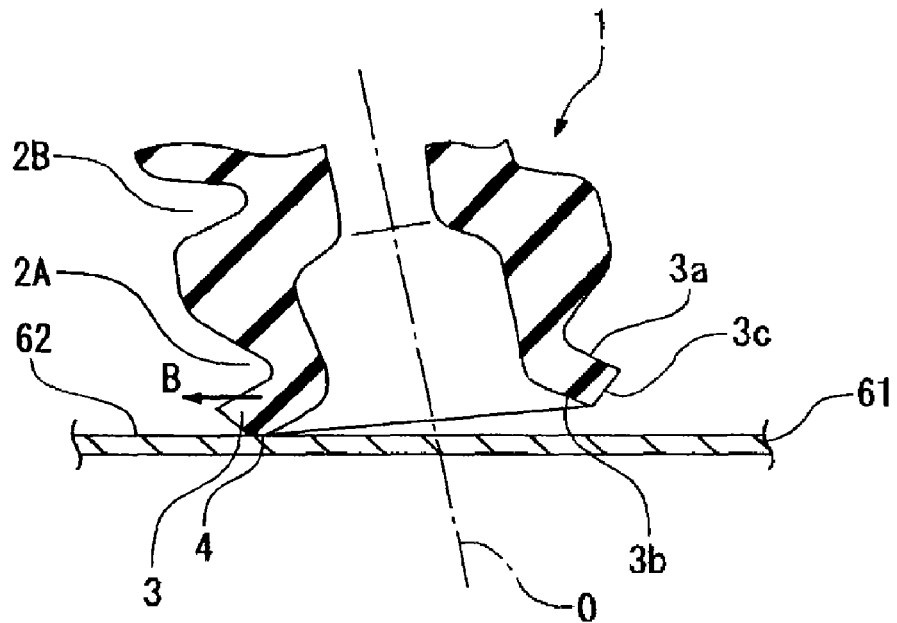
FIGS. 2A and 2B are sectional views of a substantial part showing an operating state of the bump stopper.
Figure 2B:
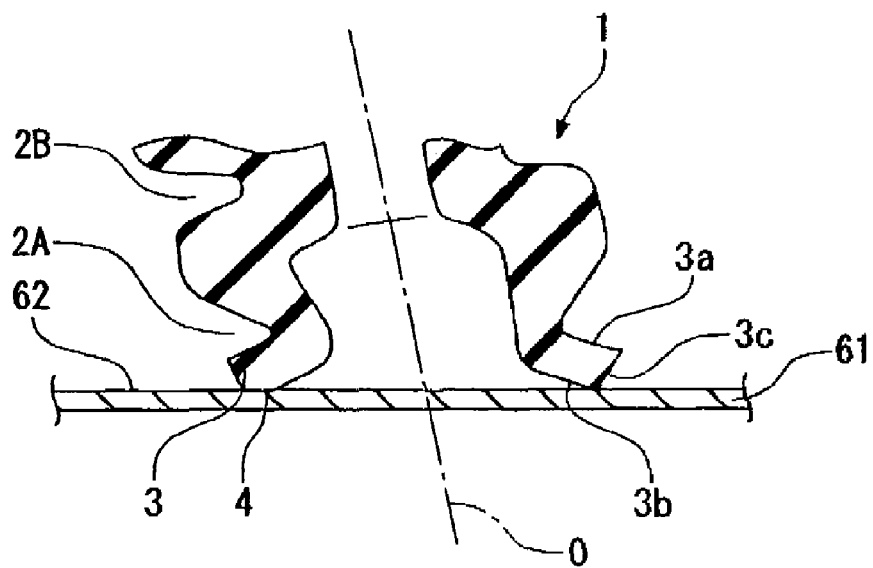
Figure 5A:
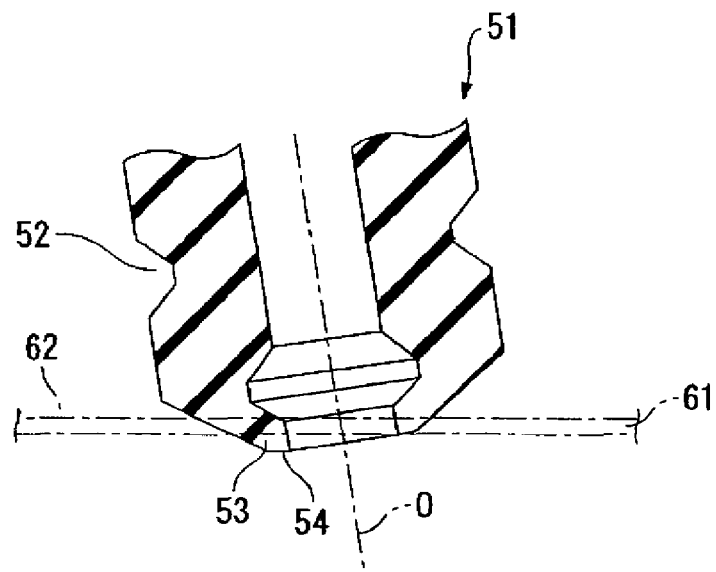
FIG. 5A is a sectional view of a substantial part of a bump stopper in accordance with a conventional example.
Figure 5B:
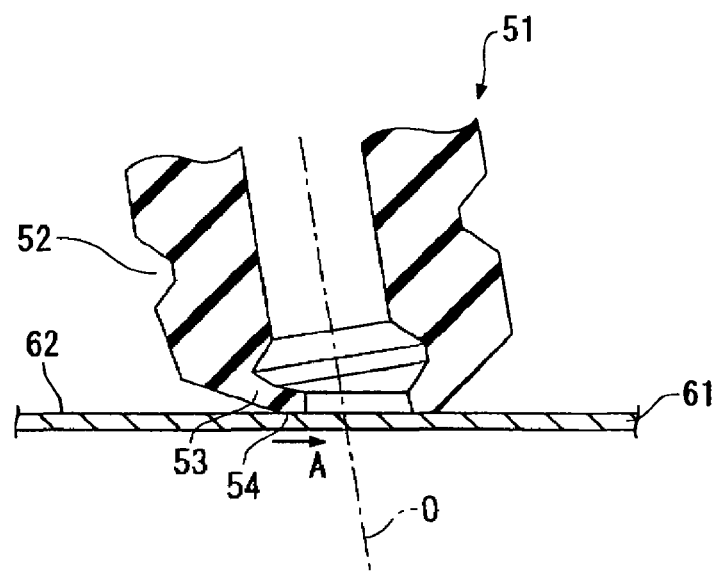
FIG. 5B is a sectional view of a substantial part showing an operating state of the conventional bump stopper.

In the bump stopper 1 having the structure mentioned above, it is formed in such the shape that the outside diameter of the bump stopper distal end portion 3 is made larger toward the distal side and the inner diameter enlarges, whereby the whole of the bump stopper distal end portion 3 is set to the trumpet shape, and the diameter $d_1$ at the collision start point 4 positioned at one position on the circumference of the inner diameter surface most distal end is set to the dimension equal to or larger than the outside diameter $d_2$ of the constricted part 2A positioned just above the same. Accordingly, when the bump stopper distal end portion 3 comes into contact with the collision surface 62 of the partner member 61 at the collision start point 4 in the state that the bump stopper distal end portion 3 is inclined as shown in FIG. 2A, a load moment caused by collision reaction force acts on the bump stopper distal end portion 3, the trumpet-shaped bump stopper distal end portion 3 is deformed by the load moment in such a manner as to collapse further to the outside diameter side (an arrow B), and an angle of collapse becomes larger and larger in accordance that the collision advances as shown in FIG. 2B. Further, the direction (the arrow B) of the collapse is an opposite direction to a direction (an arrow A in FIG. 5) of the slip in the description of the conventional art. Accordingly, the distal end portion 3 stays at the original collision position instead of slipping on the collision surface 62 of the partner member 61. Therefore, it is possible to substantially inhibit the bump stopper distal end portion 3 from slipping on the collision surface 62 at a time when the bump stopper distal end portion 3 comes into collision with the partner member 61, whereby it is possible to effectively prevent a noise (an abnormal noise) from being generated by the slip.

Figure 3:
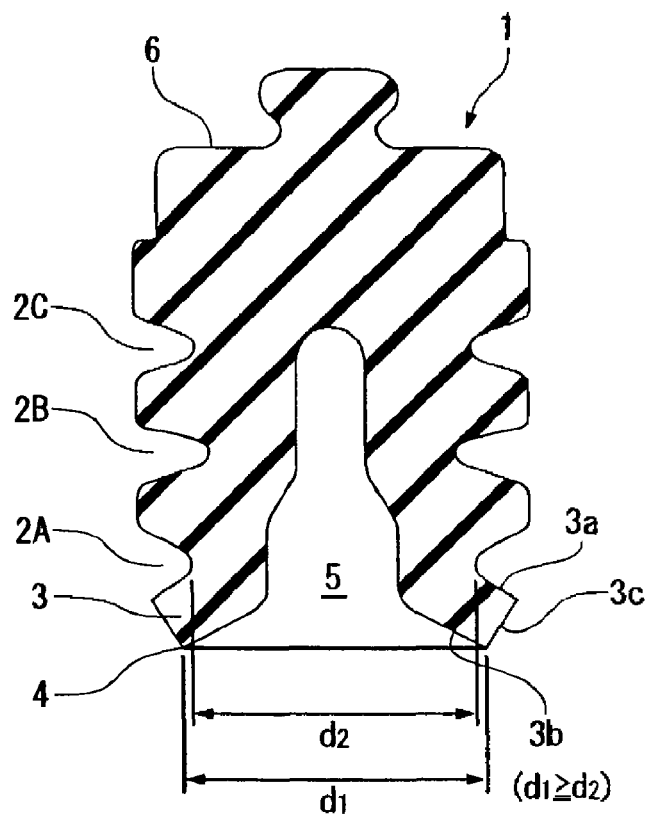
FIG. 3 is a sectional view of a bump stopper in accordance with another embodiment of the present invention.

Further, in the present invention, the structure of the whole of the bump stopper is not particularly limited, as long as it has the constricted parts 2A and 2B in the circumferential surface and comes into collision with the partner member 61 by the annular distal end portion 3 in the axial direction. A space portion 5 is set at an inner circumferential side of the annular distal end portion 3 in the axial direction. However, the space portion 5 does not necessarily reach the bump stopper upper end portion 6, but may be formed, for example, in an end stop shape as shown in FIG. 3. The number of the constricted parts 2A and 2B is not particularly limited, and the constricted parts 2A, 2B and 2C are provided at three positions in an example in FIG. 3.

Further, the collision start point in the distal end may be constructed by an annular acute projection or a projection having a semicircular cross section, a rectangular cross section or a triangular cross section, and may be formed in such a shape that is arranged so as to be divided into a plurality of pieces on the circumference, in addition to the annularly continuous shape.

Figure 4:
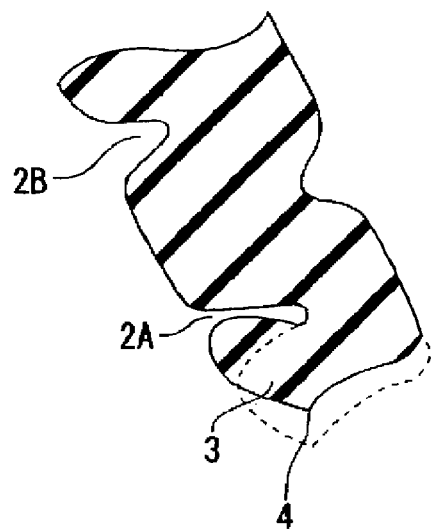
FIG. 4 is a sectional view of a substantial part showing an operating state of a bump stopper in accordance with an embodiment of the present invention.

A thickness from the collision start point of the distal end to the outside diameter side is appropriately set in such a manner as to maintain a rigidity of the bump stopper itself as well as securing collision reaction force so as to regulate a bump stopper compression amount (refer to FIG. 4).

Further, as for the bellows shape of the bump stopper, the diameter of the constricted part close to the distal end (the lower side) is preferably set to such a shape as to be larger than the diameter of the constricted part above the same.

What is claimed is:

1. A bump stopper for a rear suspension having multiple constricted parts in a circumferential surface surrounding an interior space and elastically deforming so as to achieve a buffering action at a time of colliding with a partner member at an annular distal end portion, said distal end portion colliding with the partner member in a state that a bump stopper central axis is inclined relative to a collision surface of the partner member,
    wherein said annular distal end portion includes an outside diameter surface, an inner diameter surface, and a distal end surface connecting the outside diameter surface and the inner diameter surface to each other,
    the outside diameter surface and the inner diameter surface continuously extend radially outwards from one of the constricted parts, which is adjacent to the distal end portion, to the distal end surface so that a distal end of the inner diameter surface is brought into contact with the partner member,
    a diameter at a collision start point positioned at the distal end of the inner diameter surface is equal to or larger than an outside diameter of the one constricted part adjacent to the distal end portion, and
    the interior space includes:
        a cylindrical bore;
        a conical surface divergently extending from an end of the cylindrical bore;
        a cylindrical surface extending from an end of the conical surface opposite the cylindrical bore; and
        the inner diameter surface conically extending outward from an end of the cylindrical surface opposite the conical surface.

2. A bump stopper as claimed in claim 1, wherein the outside diameter of the one constricted part adjacent to the distal end portion is larger than an outside diameter of another constricted part located more axially distant from the distal end portion than the one constricted part adjacent to the distal end portion.

3. A bump stopper for a rear suspension comprising:
    an elastomeric body having an interior space and an outer circumferential surface;
    multiple circumferential constrictions formed along the outer circumferential surface in the elastomeric body;
    an annular distal end portion of said body having an outside diameter surface, an inner diameter surface substantially parallel to the outside diameter surface, and a distal end surface connecting the outside diameter surface and the inner diameter surface to each other;
    the outside diameter surface and the inner diameter surface continuously extending conically outwards from one of the constrictions to the distal end surface, the distal end surface having a taper shape reducing in diameter from the outside diameter surface to the inner diameter surface, the one of the constrictions being adjacent to the distal end portion,
    a distal end of the inner diameter surface being adapted to be brought into contact with a partner member, a diameter at a collision start point at the distal end of the inner diameter surface being equal to or larger than an outside diameter of the one constriction, and
    a thickness inside the one constriction forming a fulcrum for a moment applied to the collision start point at the distal end of the inner diameter surface so that the annular distal end portion elastically deforms and achieves a buffering action at a time of colliding with the partner member in a state that a bump stopper central axis is inclined relative to a collision surface of the partner member,
    wherein the interior space includes:
        a cylindrical bore;
        a conical surface divergently extending from an end of the cylindrical bore;
        a cylindrical surface extending from an end of the conical surface opposite the cylindrical bore; and
        the inner diameter surface conically extending outward from an end of the cylindrical surface opposite the conical surface.

* * * * *